Patented Sept. 2, 1941

2,254,562

UNITED STATES PATENT OFFICE 2,254,562

PROCESS OF PREPARING KETONES OF THE STEROL SERIES

Max Bockmühl, Gustav Ehrhart, and Heinrich Ruschig, Frankfort-on-the-Main-Hochst, Germany, assignors to Winthrop Chemical Company, Inc., New York, N. Y., a corporation of New York No Drawing. Application March 23, 1937, Serial No. 132,635. In Germany March 28, 1936

7 Claims. (Cl. 260—397.3)

The present invention relates to a process of preparing ketones of the sterol series.

We have found that these ketones may be prepared in the following manner: Carboxylic acids of the general formula RCOOH wherein R stands for an unsaturated cyclopentanopolyhydrophenanthrene residue which in 3-position has an acyl-oxy radical, for instance the acetyl-oxy radical are subjected to a decomposing process known as Curtius reaction or Hofmann reaction. In the amine thus obtained the acyl-hydroxy group is saponified by the action of alkali and, after the double bond has been protected in a suitable manner, especially by the addition of bromine, the hydroxy group thus produced is oxidized so as to form the oxo group. As oxidizing agent particularly chromic acid may be used. The oxo-amine thus obtained is debrominated and transformed into the corresponding alcohol by hydrolysis or by the action of nitrous acid; by a further oxidation and after intermediate protection of the double bond this alcohol may be transformed into the corresponding di-ketone.

Instead of transforming the amino group standing in 17-position into the oxo group by way of the alcohol, the same effect may be attained by causing the amino group at any desired stage of the process, to react with hypochlorous acid, eliminating hydrochloric acid by means of sodium alcoholate and subjecting the compound thus obtained to a hydrolysing process in an acid medium.

The following example serves to illustrate the invention, but it is not intended to limit it thereto:

7.2 grams ($2/100$ mol) of the 3-acetoxyaetiocholenyl carboxylic acid (17) are heated for 2 hours in a reflux apparatus in 80 cc. of dry benzene with 21 grams of thionyl chloride, the solution is evaporated under reduced pressure and the residue is caused to react in aqueous acetone with twice the theoretical quantity of sodium azide. The acid azide which is unstable in air is at once transformed into the corresponding iso-cyanate by boiling it in dry toluene.

4 grams of the iso-cyanate thus obtained are saponified for 30 minutes in 100 cc. of ether and 100 cc. of benzene with 150 grams of sulfuric acid of 60 per cent. strength; preferably the temperature is maintained between 0° C. and room temperature. The amine sulfate obtained is introduced into an alcoholic caustic soda solution of 7.5 per cent. strength and the whole is allowed to stand for 24 hours. The solution is then poured into water and the colloidal mixture is extracted with ether. After the ethereal solution has been dried the amine may be precipitated with the aid of hydrochloric acid. The decomposition point of the hydrochloride of the amine is at 300° C.

2.5 grams of the amine obtained as described above are dissolved in 80 cc. of glacial acetic acid and 1.38 grams of bromine in 20 cc. of glacial acetic acid are introduced drop by drop into the solution; 1.73 grams of chromic acid anhydride in 20 cc. of acetic acid of 50 per cent. strength are added at 0° C. After the solution has been allowed to stand for 24 hours at 15° C. 2.5 grams of zinc dust are added and the whole is allowed to stand for further 6 hours. After an addition of 15 cc. of benzene, 10 cc. of water and 1 further gram of zinc dust the mixture is boiled for 30 minutes in a reflux apparatus, poured into water and neutralized and the oxoamine obtained is set free by means of a solution of sodium carbonate. The oxo-amine may also be formed by dissolving the amine in acetone, adding tertiary aluminium butylate dissolved in benzene and heating for about 10 to 15 hours in a reflux apparatus. The mixture is now extracted with ethereal solution and the residue of the ether is treated on the water bath at 50° C. to 70° C. in aqueous alcohol with sodium nitrite and acetic acid. After water has been added and the solution has been extracted with ether the crude testosteron is obtained which after having been recrystallized has a melting point of 154° C. to 155° C. The yield amounts to 0.6 gram. By the oxidation of the cyclic alcohol after intermediate protection of the double bond the corresponding di-ketone is obtained.

The following table of formulae serves to illustrate the reaction described above:
I. Acetoxyaetiocholenyl carboxylic acid
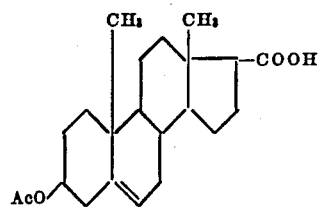
↓ SOCl₂
II.
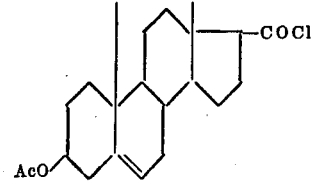
↓ NaN₃
III.
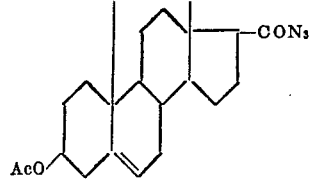
↓
IV.
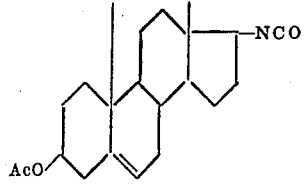
↓ H₂SO₄(60%)
V.
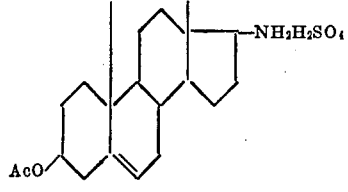
↓
VI.
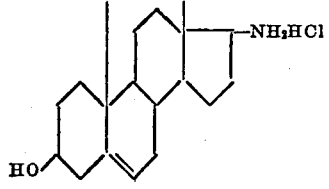
Br₂ →
VII.
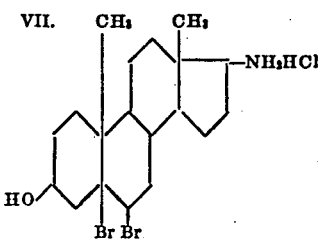
↓ CrO₃
VIII.
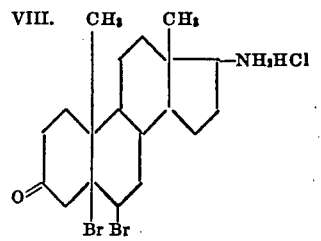
↓ Zn
IX.
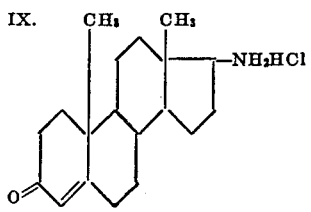
↓ NaNO₂
X.
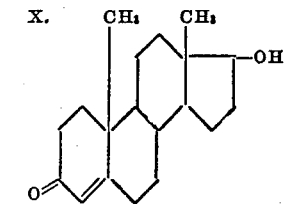
↓
XI.
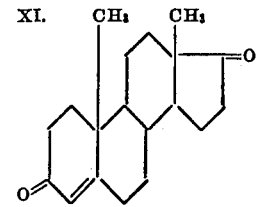

We claim:

1. The process which comprises subjecting a carboxylic acid of the general formula RCOOH wherein R stands for an unsaturated cyclopentanopolyhydrophenanthrene radical having in 3-position an acyl-oxy radical to the decomposing method known as Curtius reaction, saponifying the acyl-oxy radical in the amine thus obtained, oxidizing the hydroxyl group by the action of chromic acid.

2. The process which comprises subjecting a carboxylic acid of the general formula RCOOH wherein R stands for an unsaturated cyclopentanopolyhydrophenanthrene radical having in 3-position an acyl-oxy radical to the decomposing method known as Curtius reaction, saponifying the acyl-oxy radical in the amine thus obtained, oxidizing the hydroxyl group, after protection of the double bond by means of halogen, by the action of chromic acid and restoring the double bond by elimination of the halogen.

3. The process which comprises subjecting a carboxylic acid of the general formula RCOOH wherein R stands for an unsaturated cyclopentanopolyhydrophenanthrene radical having in 3-position an acetoxy radical to the decomposing method known as Curtius reaction, saponifying the acetoxy radical in the amine thus obtained, oxidizing the hydroxyl group, after protection of the double bond, by the action of chromic acid.

4. The process which comprises subjecting a carboxylic acid of the general formula RCOOH wherein R stands for an unsaturated cyclopentanopolyhydrophenanthrene radical having in 3-position an acetoxy radical to the decomposing method known as Curtius reaction, saponifying the acetoxy radical in the amine thus obtained, oxidizing the hydroxyl group, after protection of the double bond by means of halogen, by the action of chromic acid and restoring the double bond by elimination of the halogen.

5. The process which comprises subjecting a carboxylic acid of the general formula RCOOH wherein R stands for an unsaturated cyclopentanopolyhydrophenanthrene radical having in 3-position an acyl-oxy radical to the decomposing method known as Curtius reaction, and causing the amine thus obtained to react with hypochlorous acid, treating the reaction product with sodium alcoholate and subjecting the compound thus obtained to a hydrolysing process in an acid medium.

6. The process which comprises subjecting a carboxylic acid of the general formula RCOOH wherein R stands for an unsaturated cyclopentanopolyhydrophenanthrene radical having in 3-position an acyl-oxy radical to the decomposing method known as Curtius reaction, saponifying the acyl-oxy radical in the amine thus obtained and causing the saponified product to react with hypochlorous acid, treating the reaction product with sodium alcoholate and subjecting the compound thus obtained to a hydrolysing process in an acid medium.

7. The process which comprises subjecting a carboxylic acid of the general formula RCOOH wherein R stands for an unsaturated cyclopentanopolyhydrophenanthrene radical having in 3-position an acyl-oxy radical to the decomposing method known as Curtius reaction, saponifying the acyl-oxy radical in the amine thus obtained, oxidizing the hydroxyl group, after protection of the double bond, by the action of chromic acid and causing the oxidation product thus obtained to react with hypochlorous acid, treating the reaction product with sodium alcoholate and subjecting the compound thus obtained to a hydrolysing process in an acid medium.

MAX BOCKMÜHL.
GUSTAV EHRHART.
HEINRICH RUSCHIG.